United States Patent [19]

Kyffin et al.

[11] Patent Number: 4,728,471
[45] Date of Patent: Mar. 1, 1988

[54] TREATMENT OF EXPANSIBLE MATERIALS TO FORM LIGHTWEIGHT AGGREGATE

[75] Inventors: Robin A. Kyffin, Porthmadog, Wales; Peter A. Young, Harrogate; Allon C. Day, Low Worsall, both of England

[73] Assignee: J. W. Greaves & Sons Limited, Gwynedd, Wales

[21] Appl. No.: 932,885

[22] Filed: Nov. 20, 1986

[30] Foreign Application Priority Data

Nov. 23, 1985 [GB] United Kingdom ............... 8528902

[51] Int. Cl.[4] ............................................. E29C 27/60
[52] U.S. Cl. ...................................... 264/43; 264/57; 264/60; 264/80
[58] Field of Search ............... 264/42, 43, 45.1, 45.2, 264/45.3, 56, 57, 60, 80, 345, 346

[56] References Cited

U.S. PATENT DOCUMENTS 3,919,378 11/1975 Smarook ........................ 264/164
3,919,446 11/1975 Smarook ........................ 264/47
4,014,968 3/1977 Simon ........................... 264/56

Primary Examiner—Frank Sever
Attorney, Agent, or Firm—Ross, Ross & Flavin

[57] ABSTRACT

Expansion of granular or particulate material is effected by supplying such material, for instance slate chips, at a charging zone CZ of a kiln 10, to the upper surface of a rotating annular hearth 12 so as to lie thereon in a uniform layer up to about three chips in thickness. The hearth 12 is rotating in the direction of the arrow 96, and the chips face thereon just after a preheating zone PHZ. The chips are carried successively through a treatment zone TZ wherein they are subjected to heat from regenerative burner arrangements 68, 70 and 64, 66 beneath hood 44, to a discharge zone DZ whereat they are loosened by a reciprocating rake 80, 82 and are blown off the hearth 12 and into a receiver 88 by air jets from radially directed nozzles 78 supplied by way of a manifold 76.

8 Claims, 11 Drawing Figures

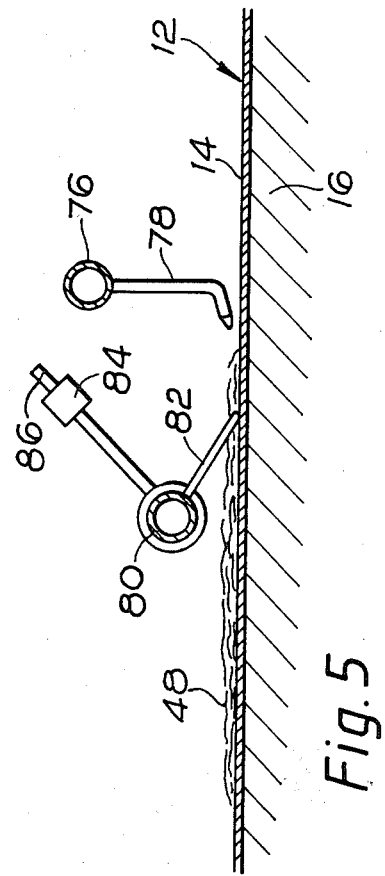
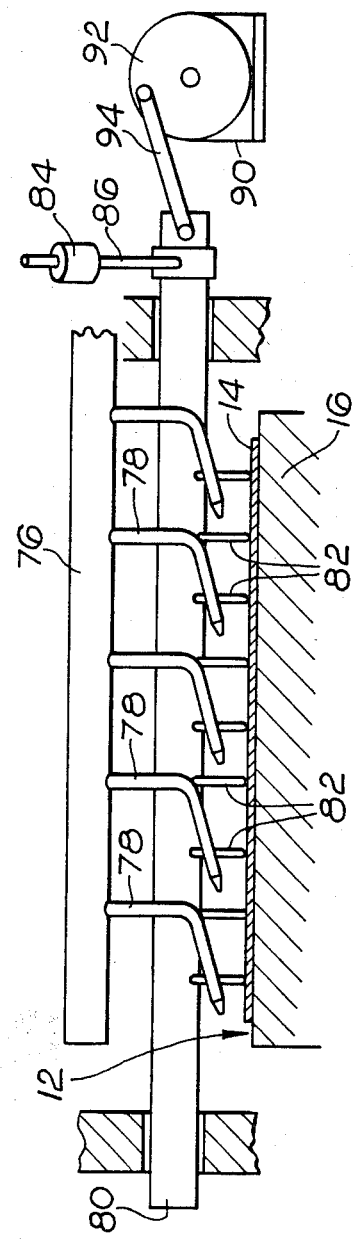
Fig. 5
Fig. 6

TREATMENT OF EXPANSIBLE MATERIALS TO FORM LIGHTWEIGHT AGGREGATE

The production of lightweight aggregate having good thermal insulating properties has become extremely important in the building industry. Statutory requirements of the United Kingdom pertaining to permissible thermal transmission through building walls have become more and more stringent over recent years, with the result that certain hitherto traditionally-used materials are no longer appropriate to be employed in building constructions. One example of this is the well-known breeze block comprising an aggregate, consisting principally of furnace clinker, bound by cement. The thermal insulation of such blocks, unless excessive thickness is used, does not come anywhere near to meeting the statutory requirements, which, as far as lightweight aggregate concrete is concerned, are capable of being fulfilled by only a few types of commercial block currently being produced in the United Kingdom. The use of lightweight aggregates is not confined just to building block production. Such aggregates have a multitude of uses in the building industry such as concrete cast in situ, precast concrete panels, lightweight concrete roof slabs, fillings for hollow cavities, lightweight reinforced concrete structures and many other applications where low thermal conductivity and lightness are important.

In very general terms, the thermal insulation properties of lightweight concrete may be regarded as being inversely proportional to density, that is to say thermal transmission increases with increase in density. It is thus appropriate for aggregate incorporated in lightweight aggregate concrete or like building blocks to have as low a density as possible. Since heat transmission is also adversely increased by the presence of water, to a marked extent, it follows also that materials incorporated into building blocks and lightweight concrete should preferably not absorb water at any significant extent.

Attempts have already been made to produce lightweight aggregates by heat treatment of various natural materials, such as certain slates, clays and shales. In the case of suitable slate wastes, many hundreds of thousands of tons exist, readily available.

Naturally, slates and clays, in their raw condition, incorporated into concrete blocks as aggregates, would not result in a lightweight concrete. However these materials can be expanded or "bloated" by suitable heat treatment to form lightweight aggregates suitable for incorporation into lightweight aggregate concretes. When so used, the resulting lightweight concrete has excellent thermal insulation properties and sufficient compressive strength for many purposes.

As has already been mentioned, attempts have been made to expand slate to form a lightweight aggregate but few commercially and economically viable processes have emerged due to practical difficulties, high fuel consumption and environmental restrictions. Moreover most of the processes proposed so far have not resulted in a fully expanded product and only partial expansion has been achieved.

The processes so far used have employed, for instance, a rotary kiln of the inclined tubular kind, slate chips being fed into the upper end of the kiln and progressing therethrough to the other lower end whereat they are discharged. In their progress through the kiln, the chips are, of course, supposed to tumble over one another, so as to be exposed to the heat supplied into the kiln, and in practice this can only be assured if the kiln temperature is restricted below the optimum for expansion. This is because the slate tends to fuse at least partially during the expansion process and adheres around the lining of the kiln; moreover, individual particles adhere to each other. This is known as "ringing", and has the effect of preventing efficient transit, through the kiln, of the material being processed. As a result it has been practical, in the past, only to produce partially-expanded slate, so that the resultant product is of greater density than could be achieved if it were possible to subject the slate to full expansion. Further, due to difficulties of useful heat recovery, high fuel consumptions have been prevalent.

An object of the present invention is to provide a method of heat treating granular or particulate material which does not suffer from the above-discussed disadvantages so that it can be employed, for instance, in relation to the expansion of slate, and comparable materials, such as clay, capable of being expanded to form lightweight aggregates, to expand the material being treated to its fullest possible extent, thereby correspondingly reducing the treated material to its lowest possible effective density.

With this object in view, the present invention provides a method of heat-treating particulate material, such as slate chips or clay pellets, so as to expand the same, and produce a lightweight granular product (which may be suitable for use, for example, in the production of constructional lightweight concrete blocks) which comprises supplying the material to a moving hearth at a charging zone so as to be distributed over said hearth, and moving the hearth successively through a treatment zone whereat the material is subjected to an elevated temperature, at which at least partial fusion takes place, so as to expand it, and a discharge zone, at which the resultant expanded product leaves or is removed from the hearth.

Preferably the expanded material is cooled at discharge. This may be effected, for instance, by blowing a fluid, such as air or steam, thereover at the discharge zone. This fluid may be employed to propel the expanded particles off the hearth.

The supply of the particulate material to the hearth is preferably such as to provide, on the hearth, a layer the thickness of which is of the order of one to three particles.

The hearth is preferably preheated by passing through a preheating zone, prior to reaching the charging zone.

During passage through the processing zone, there is no significant relative movement between the individual particles and the hearth itself, or between individual particles themselves, and the unacceptable problems of particle agglomeration and adhesion to the hearth are eliminated or minimised.

The hearth used in carrying the method of the invention into effect is advantageously of endless construction, so that at any one time different portions thereof are present in the various zones above-enumerated. To achieve this, the hearth is conveniently composed of a plurality of adjacent or interconnected tiles, of a suitable heat-resistant and substantially chemically-inert material, such as silicon carbide. In one arrangement, these tiles may, for example, be square, hingedly connected to one another in an endless-belt-like assembly, guided around suitable rollers or drums, an upper horizontal run of the assembly providing successively the charging zone, the treatment zone, the discharge zone and when provided, a preheat zone.

In a preferred arrangement, however, the hearth is of flat disc-like or annular configuration, constructed of adjacent or connected tiles if so desired, and adapted to rotate in a substantially horizontal plane about a substantially vertical axis, a housing or housings enclosing the majority of the hearth and providing, successively, the charging zone, the treatment zone, the discharge zone and, when provided, the preheating zone.

At the treatment zone, the relevant housing part advantageously encloses or is in the form of a furnace equipped with regenerative burners whereby the fuel input necessary for heating the material under treatment is kept to a minimum. The preheating zone, where provided, is preferably of comparable form.

As applied to the expansion of slate chips to produce a lightweight granular material suitable, for example, for use in the production of high quality low-density concrete, concrete blocks, and similar products, structures and articles, the material is preferably subjected to a temperature for instance in the range from 1100° C. to 1300° C., typically approximately 1250° C., in the treatment zone, and is reduced to a temperature for instance in the range 900° C. to 1100° C., typically approximately 1050° C., at discharge.

In an annular-hearth-type apparatus adapted to run at a rotational speed for instance, in the range of one revolution in 1.5 to 4.0 minutes, the proportion of the annulus allocated to each of the zones may, for instance, be approximately as follows:

| Zone | % of whole | degrees |
| --- | --- | --- |
| Preheating zone | 25 to 40% | 90° to 144° |
| Charging zone | 3 to 8% | 10.8° to 28.8° |
| Treatment zone | 62 to 37% | 223.2° to 133.2° |
| Discharge zone | 10 to 15% | 36° to 54° |

In order that the invention may be fully understood, it will be described further, by way of example, with reference to the details of a preferred practical example of the process, and the manner in which it is carried into effect, as illustrated in the accompanying drawing, in which:

FIG. 5 is a diagrammatic sectional elevation corresponding approximately to the line V—V of FIG. 4;

FIG. 6 is a diagrammatic sectional view corresponding approximately to the line VI—VI of FIG. 4;

Throughout the various figures, similar reference numerals have been allocated to similar parts.

Figure 1:
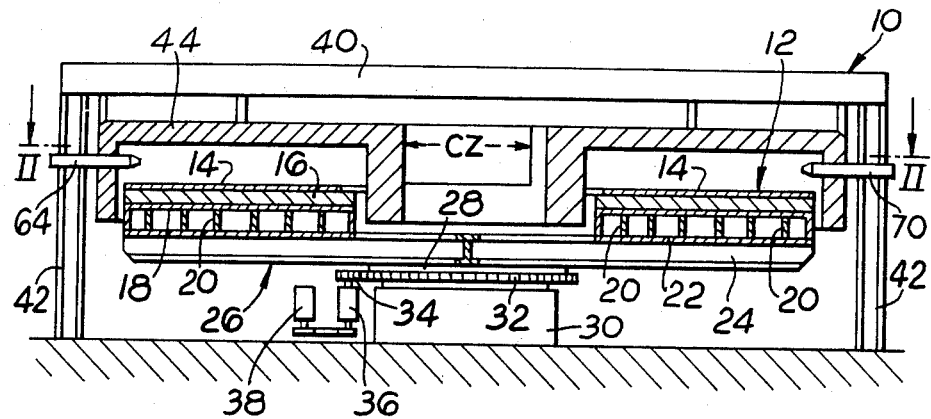
FIG. 1 is a diagrammatic sectional elevation illustrating a practical embodiment of the apparatus of the invention.

Referring firstly to FIGS. 1 to 6 of the drawings, in carrying out the preferred process of the invention, as applied to the expansion of particles in the form of slate chips produced, for instance, by crushing waste slate, e.g. that to be found in the Blaenau Ffestiniog region of North Wales, one uses an annular furnace arrangement which is indicated generally by the reference numeral 10 in the figures. This furnace arrangement comprises an annular hearth 12 composed of a plurality of heat-resistant tiles 14 made, for instance, of silicon carbide. The tiles 14 are disposed in an annular array and are supported upon an annular bed 16 of heat-insulating material, which in turn rests upon a ring 18, e.g. of metal, which constitutes a top plate of an annular carrier which is of box-like radial section with intermediate strengthening spacers 20 between such top plate 18 and a bottom plate 22 thereof. The annular carrier 18, 20, 22 is supported upon the outer ends of radial arms 24 of a spider 26 mounted upon a slewing ring 28 carried upon a plinth 30 so as to be rotatable about a vertical axis which coincides with the central axis of the annular hearth 12. A drive gear 32 is provided around the slewing ring 28 and is engaged by pinion 34 on a gearbox 36 driven from an electric motor 38, so that when the motor 38 is energised the hearth 12 is rotated about its central axis at a rotational speed, for example, in the range of one revolution in 1.5 to 4.0 minutes.

Figure 2:
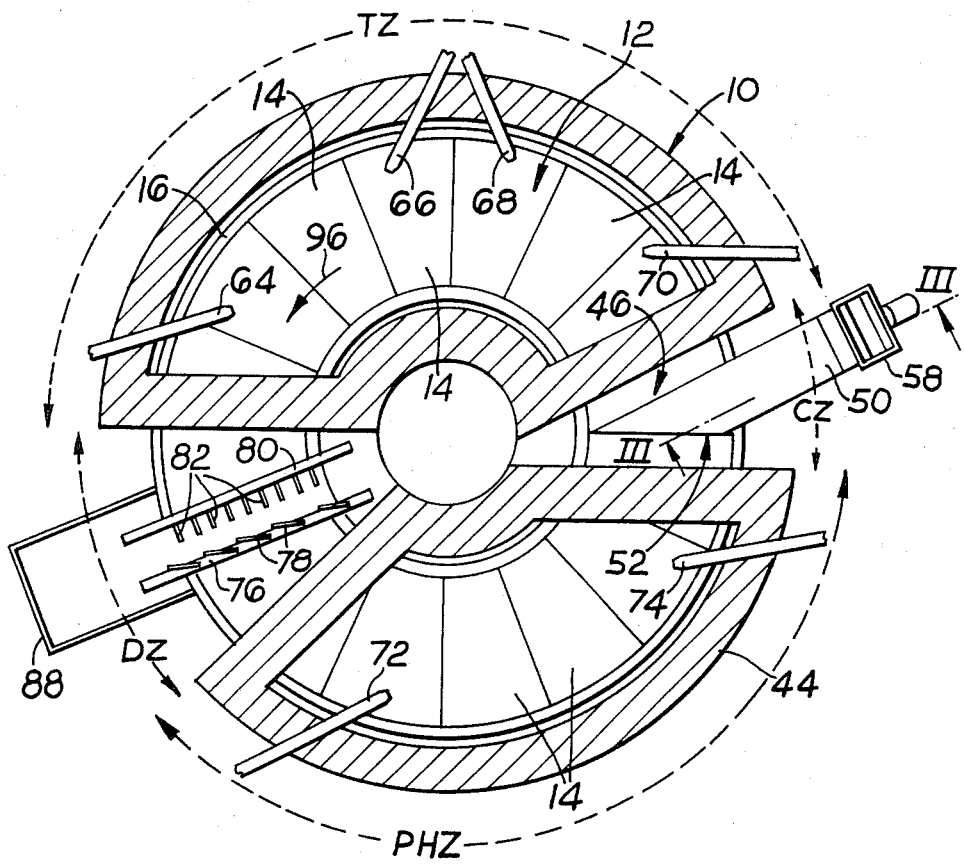
FIG. 2 is a diagrammatic sectional plan view of the apparatus of FIG. 1, the section being taken approximately on the line II—II of FIG. 1.

Supported from above by a superstructure including, for example, cross-members 40 supported by legs 42 (which superstructure has been omitted from FIG. 2 for clarity) is a heat-insulating furnace hood 44 which is inverted-U shaped in radial cross-section and is of a configuration such as to enclose substantially the whole of the hearth 12 leaving gaps for a charging zone and a discharge zone shown diagrammatically at CZ and DZ respectively in FIG. 2. This hood 44 may be composed, for instance, of a plurality of ceramic or refractory sections backed by heat-insulating material, and the portion of the hearth 12 that it covers between the charging zone CZ and the discharge zone DZ may be considered as comprising a preheating zone PHZ of extent approximating to about 37.5% of the whole hearth, being approximately 135° of the entire annulus, and a treatment zone TZ approximating to 44.5% being about 160° in extent. The charging zone CZ approximates to about 5.5%, being about 20° in extent, and the discharge zone DZ approximates to 12.5% of the whole hearth 12 and being about 45° in extent.

Figure 3:
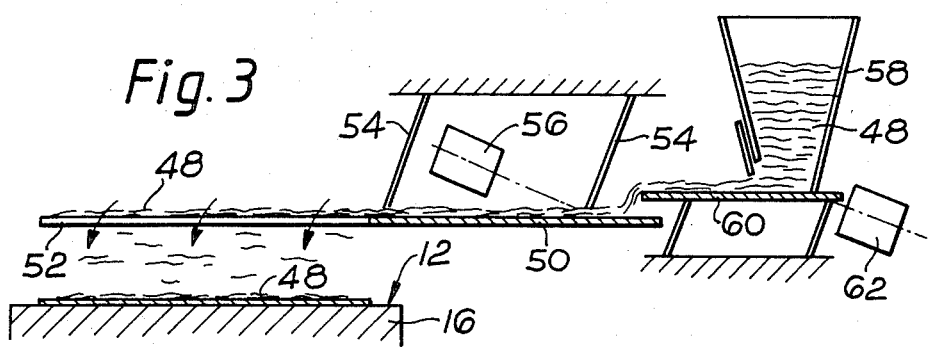
FIG. 3 is a diagrammatic sectional elevation, to an enlarged scale, taken approximately as indicated by the line III—III of FIG. 2, illustrating the structure of the apparatus at its charging zone.

In register with the charging zone CZ, the hood 44 has an opening indicated diagrammatically at 46 in FIG. 2 in its top to permit supply therethrough of material to be expanded such as slate chips indicated diagrammatically at 48 in FIG. 3. For achieving such supply, a substantially planar chute plate 50 is provided to project from outside horizontally into the hood 44 to terminate in an oblique weir edge 52 which is disposed substantially radially of the hearth 12 across substantially the entire radial width thereof. This chute plate 50 is mounted on flexible supports shown diagrammatically at 54 and is adapted to be vibrated in its longitudinal direction by a vibrator motor indicated diagrammatically at 56. Supply of the slate chips 48 to the plate 50 is achieved by means of a hopper 58 supported on a carrier plate 60 adapted to be vibrated by a respective vibrator motor 62. This arrangement is particularly effective in ensuring that a uniform layer of the slate chips 48 is supplied to the annular hearth 12, this being, for instance up to about three chips in thickness, preferably two chips in thickness. The rate of feed can, of course, be controlled in any suitable manner, for instance by control of the frequency and/or amplitude of the vibration of the carrier plate 60 and/or the chute plate 50.

The treatment zone TZ and the preheating zone PHZ of the apparatus are fitted with respective heating means in the form of series of regenerative burner arrangements. In the illustrated case there is a first pair of complementary burners 64, 66 directed towards one another across approximately one half of the treatment zone TZ, a second pair of complementary burners 68, 70 directed towards one another across the other half of the treatment zone TZ, and a third pair of complementary burners 72, 74 directed towards one another across the preheating zone PHZ. As is well known, such regenerative arrangements are actuated so that one burner of the pair is operatively supplied with a combustible fuel/air mixture and applies heat to its respective portion of the furnace, the products of combustion, after passing across said portion, being taken up by the complementary burner and passed to equipment which serves to retain and accumulate residual heat contained in such combustion products. Upon the accumulated heat reaching a predetermined level, the roles of the two burners of the pair are reversed, the previously-accumulated heat each time serving to preheat the combustion air being supplied to the operative burner. In the illustrated case, the burner arrangements are controlled to maintain a temperature of approximately 1250° to 1300° C. within the treatment zone TZ and ensuring that the hearth, in the preheating zone PHZ is heated to a temperature typically of the order of 1250° C.

Figure 4:
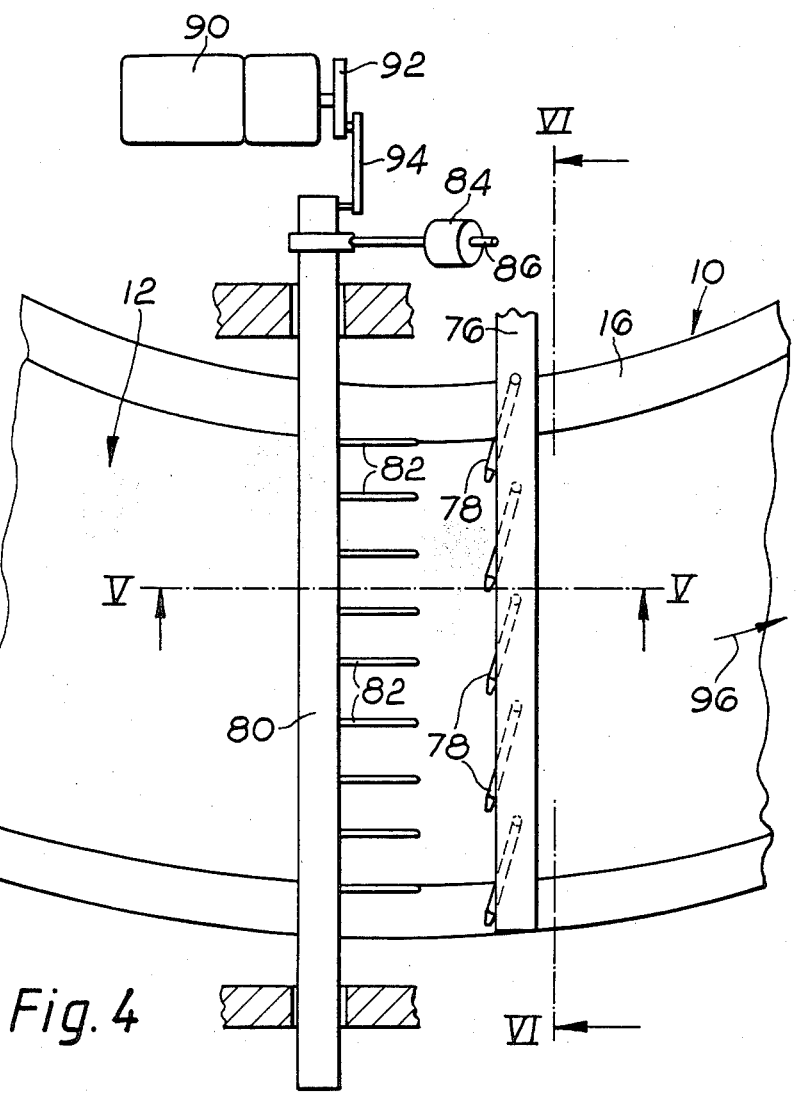
FIG. 4 is a fragmentary detail, to an enlarged scale, illustrating the structure of the apparatus at its discharge zone.

As shown in detail in FIGS. 4, 5 and 6, in the discharge zone DZ, a manifold pipe 76 extends approximately radially across the hearth 12, above the latter, and this is connected to a compressed air source (not shown) and supplies a plurality of angled nozzles 78 which are each directed downwards and radially outwards of the hearth 12 so as to supply continuous streams of air towards the hearth and any material present thereon.

Extending across the hearth 12, substantially parallel to the manifold pipe 76, in the discharge zone DZ, in an approximately radial rake bar 80 which is mounted so as to be turnable about its longitudinal axis. This bar 80 is of hollow tubular form, and is cooled by passing air therethrough. It is also displaceable in its axial direction. A plurality of tines 82 of suitable heat-resistant metallic material project from the bar 80 in a downwardly inclined disposition to rest by their lower ends on the hearth 12 in a line adjacent to the nozzles 78, and a weight 84 disposed at an over-centre disposition on a radial weighting arm 86 secured to the bar 80 serves to bias the bar into a position in which the tines 82 press on the hearth 12 with a pressure which can be varied by adjustment along the arm 86 of the weight 84. This arrangement enables the tines 82 to ride over any irregularities at the junctions between adjacent tiles forming the hearth 12. Provided alongside the hearth 12 in register with the discharge zone DZ is a product receiver 88 so disposed that any material blown off the hearth 12 by the air from the nozzles 78 will fall into the receiver 88.

The rake bar 80 is adapted to be reciprocated axially, so that the tines 82 will effectively move radially relative to the hearth 12, firstly outwardly and then inwardly, as the hearth 12 moves therebeneath, by means of a variable-speed electric motor 90 and a crank and connecting rod arrangement 92, 94 illustrated diagrammatically in FIGS. 4 and 6.

The operation of the apparatus, and accordingly the preferred method of the invention, will readily be understood from the foregoing. The furnace is turned on and set to operate to produce a working temperature, in the treatment zone TZ, of the order of 1300° C., which is such as to cause at least partial fusion of slate. The air supplied to the nozzles 78 by way of the manifold pipe 76 is such as to reduce the temperature of material under treatment to about 1050° C. which is well below the fusion temperature of the slate.

The hearth 12 is driven in rotation, in the direction indicated by arrow 96 (FIGS. 2 and 4) and the vibrator motors 56 and 62 are set into operation, with the result that the slate chips 48 are fed to the hearth in a substantially uniform layer in general not greater than three chips in thickness, but preferably only two chips or one chip in thickness. This layer is firstly conducted through the treatment zone TZ and in this, the slate chips are caused to expand. In practice, with the chips, which may each be initially only two to four millimeters thick, remaining in the treatment zone TZ for an appropriate time, an expansion to as much as four or five times the original thickness, for instance to about eight to twenty millimeters, can be achieved, with the initial specific gravity of the slate of approximately 2.6 to 2.8 being reduced to as little as 0.6.

Virtually maximum chip expansion is achieved because initial heating of the outside of each chip to incipient fusion is very rapid. As a result, each chip is externally sealed, and as heat penetrates, it produces expansion gases whose escape is inhibited and a maximum degree of expansion is achieved. Slow heating would allow gases to escape with loss of expansion and consequently a denser product. This latter is a failing of some prior known methods of expanding slate and similar expansible materials, for example those using rotary kilns as previously referred to.

After passing through the treatment zone TZ, at a speed such as to ensure full expansion, the particles or chips 48 then reach the discharge zone DZ at which they encounter the tines 82 which ensure that they do not adhere to the hearth 12 and are then impinged upon by air from the nozzles 78 by which they are cooled to about 1050° C. so that any fusion is counteracted and the expanded particles are assuredly in the solid phase. The air blasts from the nozzles 78 serve also to entrain the expanded particles and deflect them radially off the hearth 12 and into the receiver 88.

Thereupon, the newly-vacated hearth passes through the preheating zone PHZ, at which its temperature is raised again to the operative figure of approximately 1250° C. whereafter it passes back to the charging zone CHZ to receive further slate chips as above discussed.

It will thus be understood that the method of the invention can be carried out as a continuous process using the apparatus as described which, of course, in itself is novel and inventive in its concept.

The application of the method of the invention, whilst not being specifically limited thereto, is particularly beneficial when applied to slate, especially slate waste originating from the slate workings of the Blaenau Ffestiniog area of North Wales, there being tremendous quantities of such waste readily available, and hiterto of little practical utility. Practical tests indicate that when fully expanded, this slate provides an extremely good lightweight aggregate for use in the production of load-bearing and/or insulating constructional blocks and other forms of constructional material. The expanded material itself, although being highly porous, is of closed pore form, and experiments show that it does not absorb water in any significant quantities even when exposed to water by physical contact therewith over a period of many months. Each expanded particle has a closed pore structure internally encapsulated in a relatively hard impervious skin, and this ensures that the particles do not absorb moisture to any significant extent. This water-resistant characteristic has the advantage that it is possible, by use of appropriate selected mixes, to use the expanded slate as an aggregate to produce concrete which does not suffer significantly from the disadvantages attendant upon water absorption which in the comparable lightweight aggregate/foamed concretes can result in substantial deterioration in the heat insulation characteristics, even when only very small amounts of water are present.

Blocks made using the expanded slate are expected readily to meet the statutory requirements as to heat insulating characteristics. They are particularly light in weight, and because they are resistant to water absorption are not susceptible to movement or dimensional instability.

Of course, the method of the invention is not confined in its application solely to slate, and it can be applied to other materials desired to be expanded by heat treatment, for example clay, shales and similar materials capable of being expanded. Clay, of course, has to be formed into pellets before treatment.

Moreover, the apparatus of the invention is not confined to the precise details of the example described above with reference to FIGS. 1 to 6, and variations or modifications may be made thereto. Two such variations or modifications are illustrated respectively in FIGS. 7 to 9 and FIGS. 10 and 11, both of which concern the components present at the discharge zone DZ of the apparatus.

Figure 7:
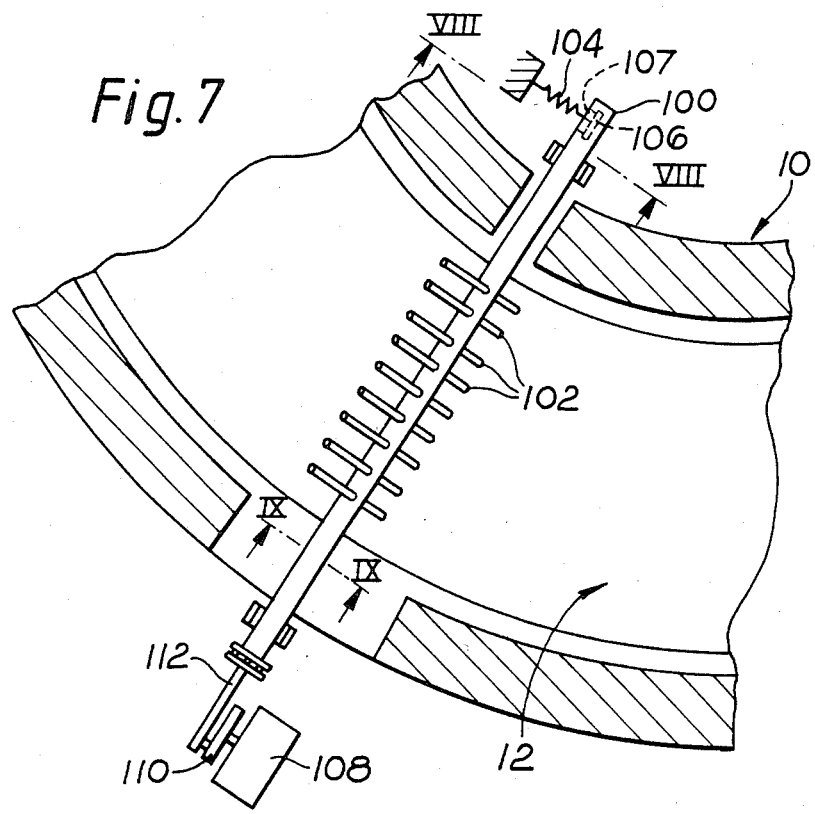
FIG. 7 is a view comparable with FIG. 4, but illustrating an alternative arrangement for the discharge zone of the apparatus.
Figure 8:
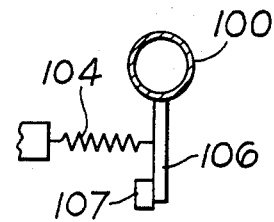
FIG. 8 is a diagrammatic section taken on the line VIII—VIII of FIG. 7.
Figure 9:
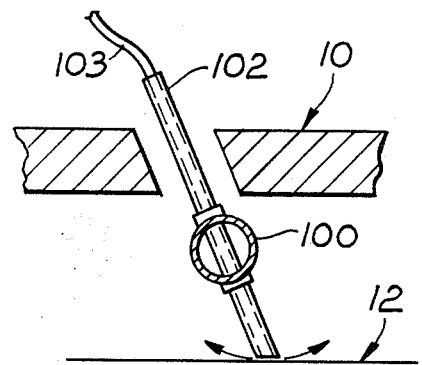
FIG. 9 is a diagrammatic section taken on the line IX—IX of FIG. 7.

In the arrangement of FIGS. 7 to 9, a hollow-sectioned air-cooled rake bar 100 extends radially across the hearth 12 at the discharge zone and is mounted so that it may turn about its longitudinal axis. It has therethrough a plurality of angularly downwardly directed hollow tines 102. These tines 102 are able to slide up and down relative to the bar 100 and they rest, under the influence of gravity, by their lower ends on the hearth 12. A biassing spring 104 connecting to a radial arm 106 (FIG. 8) projecting from the rake bar 100 enables the tines 102 to ride over sharp irregularities in the surface of the hearth and biasses the radial arm 106 against a stop 107 to maintain the tines 102 at the desired angle. Each of the hollow tines 102 is connected by a respective flexible tube 103 to a source of compressed air. The hollow tines 102 serve, therefore, both to apply air for cooling the expanded slate particles before they are blown off the hearth by the subsequent nozzles (such as the nozzles 78) which are not shown in this figure and as rake tines which ensure that the particles do not stick to the hearth. The introduction of this cooling air at the interface between the tiles of the hearth 12 and the expanded slate is especially beneficial in ensuring that the expanded slate is detached and the hearth is cleaned. The air emerging from the tines 102 and impinging on the hearth 12 tends to contribute to levitation of the tines 102 relative to the hearth surface, but nevertheless maintains the tines in contact with any scab that may be formed thereon. As in the preceding embodiment, the tines 102 are caused to reciprocate radially of the hearth 12 by axial movement of the rake bar 100, imparted thereto by a motor 108 and a crank and connecting rod arrangement 110, 112.

Figure 10:
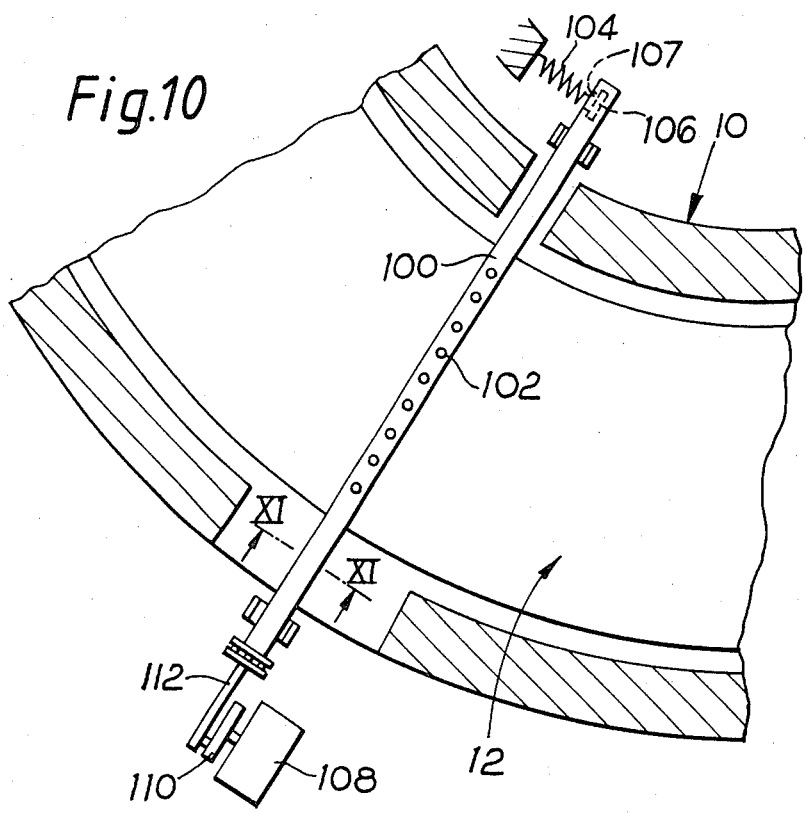
FIG. 10 is a view similar to FIG. 7, but showing another alternative arrangement.
Figure 11:
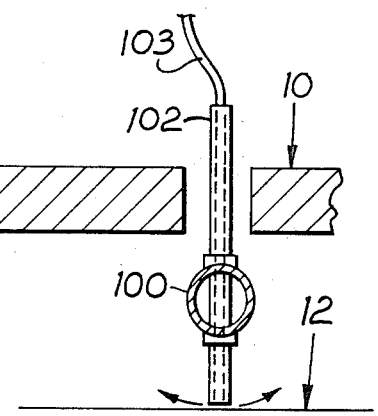
FIG. 11 is a diagrammatic sectional view taken on the line XI—XI of FIG. 10.

The arrangement illustrated in FIGS. 10 and 11 is very similar in its construction and operation to that of FIGS. 7 to 9, in that the hollow tines 102, carried by the rake bar 100, serve both to provide air to cool the expanded particles before they are blown of the hearth 12 and as rake tines serving to ensure, mechanically, that none of the expanded particles sticks to the hearth 12 in a manner analogous to that described above with reference to FIGS. 7 to 9. In this case, however, the hollow tines 102 are disposed substantially vertically relative to the hearth 12. Such an arrangement is found to be particularly effective in ensuring that all of the treated particles are discharged at the discharge zone by the air blasts from the nozzles, such as nozzles 78, which again have been omitted from this figure. A particular advantage of this arrangement is that the tines need only be squared-off at their lower ends, and thus do not require to be installed at any particular orientation.

Other modifications are, of course, possible for instance, the method of the invention could, if desired, be carried out using a hearth which is of endless construction, being composed of connected hearth tiles extending in a linear forward run successively through an optional preheating zone, a charging zone, a treatment zone, an optional cooling zone and a discharge zone in a manner somewhat comparable with the described arrangements, the hearth tiles then passing to a return run and returning to the preheating zone. In the illustrated case there may be a plurality of concentric rings, each formed of adjacent tiles, to make up the hearth and in such a case, (and perhaps in other instances) it may be desirable for at least certain of the tines 82 or 102 to be carried by a spring-loaded gimbal assembly. The effect of this would be to prevent the tines from snagging in and damaging the hearth at the junctions between tiles.

In the illustrated and described arrangements, the specific details are only exemplary. The temperatures used in the treatment zone and preheating zone may vary from those given, for instance by as much as 200° C. to each side of the figures given. The material to be treated may be supplied onto the hearth in any suitable manner; the treatment zone and the preheating zone may be heated otherwise than by regenerative burners (although these latter are most economical); and separation of the expanded particles from the hearth may be effected differently. For instance in the illustrated cases, a scraper, with or without nozzles or the like to create jets of cooled air directed towards the upper surface of the hearth so as to assist detachment of the expanded particles therefrom, may be provided for deflecting the expanded particles from the hearth and into the receiver. Additionally hearth cleaning means, for example in the form of an air-cooled rotary brush disposed approximately parallel with the manifold 76, may be provided behind the latter. Other means, such as a reciprocating brush or the like may be provided in addition or in the place of the rake 80, 82 for ensuring removal of the expanded particles from the hearth. Any suitable cooling fluid, for instance steam, may be supplied to the ejection nozzles and/or the tines in the place of air.

We claim:

1. A method of heat-treating expansible particular materials to expand the same and produce a lightweight granular product comprising: precluding adherence of at least partially fused particles of said material to each other and the lining of a kiln by, providing a moving hearth within said kiln, feeding said material to said moving hearth at a charging zone so as to be distributed over said hearth, and moving the hearth successively through a treatment zone of elevated temperature sufficient to at least partially fuse and expand said material and thereafter, a discharge zone, at which the resultant expanded product is discharged from said hearth.

2. The method according to claim 1 including the further step of cooling the expanded material upon discharge.

3. The method according to claim 2 wherein the cooling is effected by blowing cooling fluid onto the expanded material at the discharge zone.

4. The method according to claim 3 whrein the cooling fluid serves also to propel the expanded particles off the hearth.

5. The method according to claim 1 wherein said particulate material is supplied to said hearth in a substantially uniform layer not exceeding three particles in thickness.

6. The method according to claim 1 wherein the expanded particles are loosened mechanically by a reciprocating rake at the discharge zone.

7. The method according to claim 6 wherein fluid to cool the expanded particles is supplied through hollow tines of said rake.

8. The method according to claim 1 further including the step of preheating the hearth prior to it reaching the charging zone.

* * * * *

UNITED STATES PATENT AND TRADEMARK OFFICE
CERTIFICATE OF CORRECTION

PATENT NO. : B1 4,728,471
DATED : Feb. 6, 1990
INVENTOR(S) : Robin A. Kyffin

It is certified that error appears in the above—identified patent and that said Letters Patent is hereby corrected as shown below:

On the title page drawing figure is incorrect.

Substitute the drawing figure below therefor.

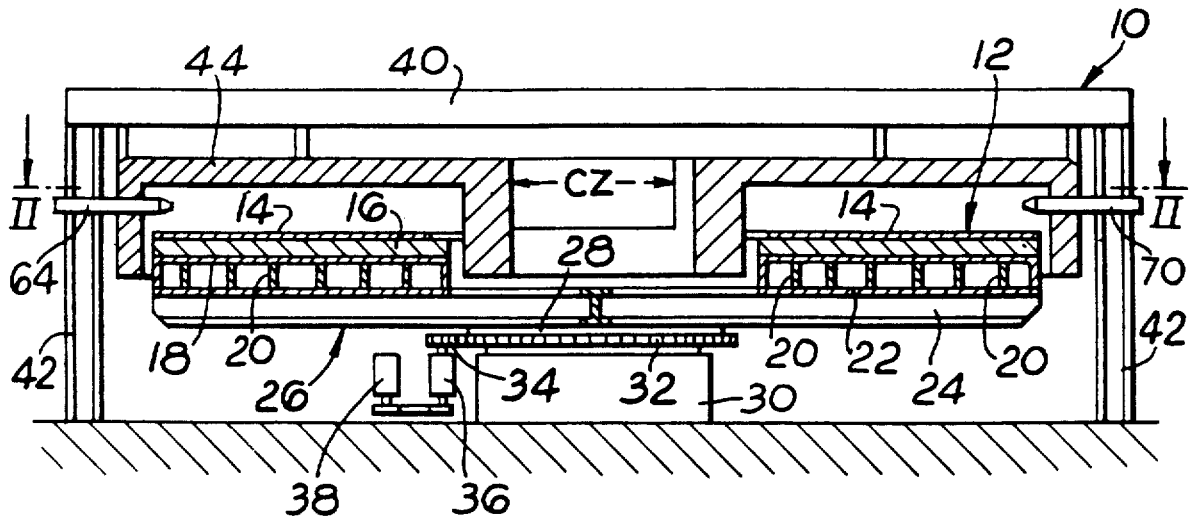

Signed and Sealed this

Fourth Day of June, 1991

*Attest:*

HARRY F. MANBECK, JR.

*Attesting Officer*    Commissioner of Patents and Trademarks

REEXAMINATION CERTIFICATE (1205th)
United States Patent [19]
Kyffin et al.

[11] B1 4,728,471
[45] Certificate Issued Feb. 6, 1990

[54] TREATMENT OF EXPANSIBLE MATERIALS TO FORM LIGHTWEIGHT AGGREGATE

[75] Inventors: Robin A. Kyffin, Porthmadog, Wales; Peter A. Young, Harrogate; Allon C. Day, Low Worsall, both of England

[73] Assignee: J. W. Greaves & Sons Limited, North Wales, United Kingdom

Reexamination Request:
No. 90/001,749, Apr. 11, 1989

Reexamination Certificate for:
Patent No.: 4,728,471
Issued: Mar. 1, 1988
Appl. No.: 932,885
Filed: Nov. 20, 1986

[30] Foreign Application Priority Data
Nov. 23, 1985 [GB] United Kingdom ............... 8528902

[51] Int. Cl.$^4$ ............................................. E29C 27/60
[52] U.S. Cl. ........................................ 264/43; 264/57; 264/60; 264/80
[58] Field of Search ................ 264/42, 43, 45.1, 45.2, 264/45.3, 56, 57, 60, 80, 345, 346

[56] References Cited
U.S. PATENT DOCUMENTS
4,637,795  1/1987  Solano et al. ..................... 432/138

FOREIGN PATENT DOCUMENTS
624032  5/1949  United Kingdom .

Primary Examiner—Frank Sever

[57] ABSTRACT

Expansion of granular or particulate material is effected by supplying such material, for instance slate chips, at a charging zone CZ of a kiln 10, to the upper surface of a rotating annular hearth 12 so as to lie thereon in a uniform layer up to about three chips in thickness. The hearth 12 is rotating in the direction of the arrow 96, and the chips face thereon just after a preheating zone PHZ. The chips are carried successively through a treatment zone TZ wherein they are subjected to heat from regenerative burner arrangements 68, 70 and 64, 66 beneath hood 44, to a discharge zone DZ whereat they are loosened by a reciprocating rake 80, 82 and are blown off the hearth 12 and into a receiver 88 by air jets from radially directed nozzles 78 supplied by way of a manifold 76.

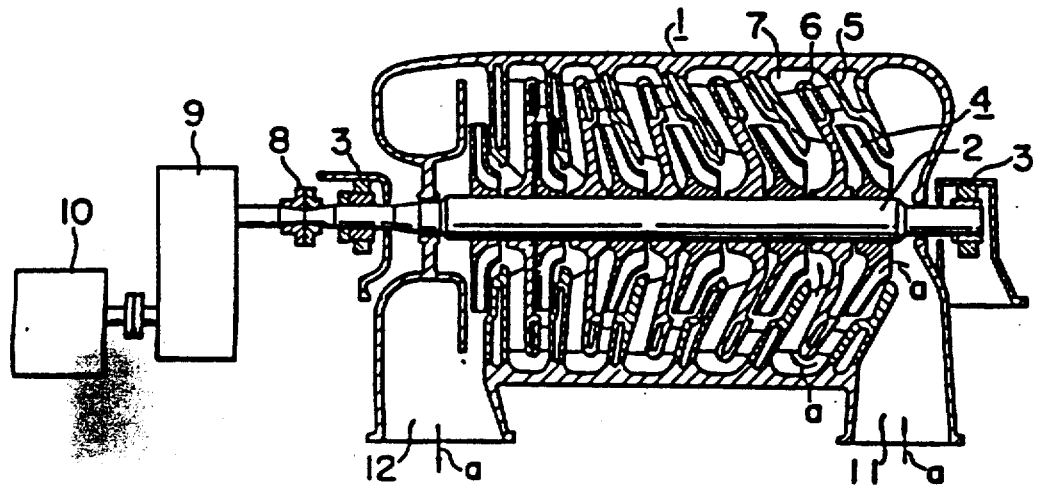

BI 4,728,471

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claim 1 is determined to be patentable as amended.

Claims 2–7, dependent on an amended claim, are determined to be patentable.

1. A method of heat-treating expansible particular materials to expand the same and produce a lightweight granular product comprising: precluding adherence of at least partially fused particles of said material to each other and the lining of a kiln by[,] providing a moving hearth within said kiln, feeding said material to said moving hearth at a charging zone so as to be distributed [over] *across substantially the entire radial extent of* said hearth and moving the hearth successively through a treatment zone of elevated temperature sufficient to at least partially fuse and expand said material [and], thereafter [,] *through* a discharge zone, at which the resultant expanded product is discharged from said hearth, *and finally through a pre-heating zone where said hearth is heated to said elevated temperature before receiving further material at said charging zone.*

* * * * *